Patented Apr. 24, 1923.

1,452,553

UNITED STATES PATENT OFFICE.

HENRY A. GARDNER, OF WASHINGTON, DISTRICT OF COLUMBIA.

DECHLORINATED CHLORINATED-GLYCERIDES AND DERIVATIVES THEREFROM.

No Drawing.      Application filed August 31, 1920. Serial No. 407,226.

*To all whom it may concern:*

Be it known that I, HENRY A. GARDNER, a citizen of the United States, residing at Washington, in the District of Columbia, have invented certain new and useful Improvements in Dechlorinated Chlorinated-Glycerides and Derivatives Therefrom, of which the following is a specification.

This invention relates to a novel method of treating fatty oils or other glycerides, and more especially oils of the non-drying or semi-drying type, to improve their drying properties and to render them more available for use in the paint, varnish and other arts; and the product resulting from such treatment. In another of its aspects the invention relates to certain novel products or compositions of matter resulting from the interaction or admixture of tung oil with glycerides which have been treated in the manner mentioned above; and to the method of preparing such products.

The method of treating the glycerides involves their subjection to halogenation, followed by the removal, preferably with the aid of a catalyst or accelerating agent, of a portion at least of the combined halogen. Chlorin is the preferred halogenizing agent.

The term "tung oil" is used herein to include not only the oil derived from the nuts of the Chinese wood oil tree (tung nuts) but also other allied oils obtained from plants of the Aleurites family.

The glycerides preferably used are oils of the non-drying or so-called semi-drying type, including cottonseed oil, and soya bean oil.

Following are certain illustrative examples in accordance with my invention, it being understood that the invention is not limited to the particular materials, proportions and manipulations described by way of example:

100 parts by weight of a fatty oil, preferably soya bean oil, are treated with chlorin until an increase of weight of about 5–15%, more or less, is obtained. The chlorination may be carried out in glass or iron vessels, using either moist or dry chlorin, and either with or without an added catalyst or accelerating agent such as anhydrous ferric chlorid or the like. Substantially anhydrous conditions are preferred when iron apparatus is used. The chlorin is preferably introduced at a sufficient rate to maintain the temperature, by means of the exothermic reaction, at about 60–80° C. or higher. Independent heating or cooling may be applied to control the temperature. Approximately one-half of the total chlorin supplied is co-incidently liberated as hydrochloric acid during this operation, and is preferably collected as such in any usual manner. By chlorination the oil acquires a golden color with marked increase of viscosity.

The partially chlorinated fatty oil is then subjected, preferably in a glass or iron vessel, to a sufficient temperature to effect the removal as hydrochloric acid of a part at least of the combined chlorin. Temperatures of the order of 220–250° C. are preferred, the evolved acid being collected and the operation preferably stopped when 40–60% of the total combined chlorin has been eliminated. This operation is most conveniently performed under a reflux condenser. The addition of a small proportion, say about 1%, of a suitable catalyst such as coppered-zinc accelerates the dechlorination and also, it is believed, aids in the production of polymerized compounds in the oil. After cooling, the product will be found to be a viscous liquid: for example when the chlorination has been limited to approximately 10% increase in weight this product has about the consistency of molasses. Other known methods for removing halogens from their organic combinations may be substituted for the above.

The product may be thinned if desired by benzol or other suitable thinners or diluents, and its drying properties will be found decidedly superior to those of the raw oil, owing to the development of so-called double bonds during the dechlorinating step. This product may be used directly in the paint and varnish arts. Complete dechlorination is not necessary, since the residual combined chlorin is very firmly held and is quite unobjectionable for most purposes.

I have further discovered that products prepared from glycerides according to the above described general method, and herein for convenience collectively referred to as "dechlorinated chlorinated-glycerides," possess the remarkable property of stimulating the polymerization or gelatinization of tung oil, and forming therewith solid or semi-solid products useful in many arts, either as solid masses or meal-like products derived therefrom, or in the form of paint and varnish films, impregnating compositions and the like. Certain examples illustrative of this property are as follows:

20 parts of dechlorinated chlorinated-soya bean oil prepared as above were mixed with 80 parts of tung oil, and the mixture heated to 160° C., at which temperature it set to a solid mass.

40 parts of dechlorinated chlorinated-soya bean oil were mixed with 60 parts of tung oil, the mixture solidifying at 120° C.

60 parts of dechlorinated chlorinated-soya bean oil mixed with 40 parts of tung oil, yielded a mixture solidifying at 110° C.

80 parts of dechlorinated chlorinated-soya bean oil mixed with 20 parts of tung oil solidified at 105° C.

The masses prepared as above differed somewhat among themselves in physical properties, but were all rubbery solids, readily cut by a knife, and reducible to meal under sufficient pressure.

The reactions involved in the above transformations are most unusual and unexpected ones, since tung oil will not polymerize at any of the temperatures mentioned; nor will the soya bean oil, either before or after chlorination. Furthermore it is well known that raw soya bean oil mixed with tung oil in proportions as low as 15–20% of the former, will prevent the polymerization of tung oil at temperatures as high as 280° C., even when that temperature is maintained for as long as twenty minutes.

I have further found that mixtures of dechlorinated chlorinated-glycerides and tung oil will solidify in time at much lower temperatures than those mentioned above, and even at ordinary temperatures. For instance, a mixture of approximately 50 parts each of dechlorinated chlorinated-soya bean oil prepared as described above, and raw tung oil, set in about two hours at room temperature to a jelly-like mass.

Any of the liquid mixtures mentioned above when spread upon glass, metal or other surfaces, set rapidly, yielding adherent and durable films suitable for varnish use. When mixed with colors or pigments they yield enamel-like compositions which dry at ordinary temperatures, or more rapidly when subjected to baking in an oven, as in the treatment of so-called Japan varnishes. The films formed at ordinary and higher temperatures are highly resistant to alkaline and acid reagents, and many other chemicals, and are applicable to such purposes as the production of durable finishes on automobile bodies and the like. In the application of these films it is not necessary to use a drier, although driers may be added to accelerate the setting, more particularly in the case of the mixtures containing the smaller proportions of tung oil. As stated above, benzol or other appropriate thinners or diluents may be added, especially when the mixture is to be employed for impregnation purposes.

The setting of the mixture, whether in the form of solid masses or of films, or when used for the impregnation of paper, cloth, wood, fiber or other porous substances, may be greatly accelerated by the use of catalyzing agents, especially sulfur or sulfur-containing bodies, such as sulfur chlorid. For example, if the films mentioned above be exposed to the vapors of sulfur chlorid they set rapidly, acquiring great toughness and elasticity. Similarly, in the preparation of solid masses, small proportions of sulfur chlorid incorporated with the mixture greatly accelerated the setting: for example as little as 2% of sulfur chlorid added to a mixture comprising equal parts of dechlorinated chlorinated-soya bean oil and raw tung oil caused the same to set almost immediately to a hard and solid but elastic product.

The properties of the products described above indicate for them a wide range of uses in the paint, varnish, plastic and other arts, such for example as in the compounding of rubber and other plastics, linoleum manufacture, the preparation of automobile tire-fillers, etc., etc.

While the invention has been described with specific reference to products derivable from soya bean oil, either alone or by reaction of the dechlorinated chlorinated-oil with tung oil, it is to be understood that it is applicable to the general class of glycerides, including the fats and fatty oils.

The invention is also applicable not only to the glycerides, but to the fatty acids prepared from glycerides, and the term "glycerides" as used in the claims is intended to include as well, the fatty acids obtained therefrom.

I claim:—

1. As a new composition of matter, a glyceride having drying properties, said glyceride derived by halogenation and dehalogenation of a glyceride of inferior drying properties.

2. As a new composition of matter, a product having drying properties, derived by limited chlorination and dechlorination of soya bean oil.

3. As a new composition of matter, a partially dechlorinated chlorinated-glyceride.

4. As a new composition of matter, partially dechlorinated chlorinated-soya bean oil.

5. A method of treating glycerides to improve their drying properties, comprising subjecting the glyceride to halogenation, and thereafter eliminating a part at least of the halogen.

6. A method of treating glycerides to improve their drying properties, comprising subjecting the glyceride to halogenation, and thereafter eliminating a part at least of the halogen by heating in presence of a catalyst.

7. Method of treating soya bean oil, comprising combining the same with chlorin and thereafter eliminating a part at least of the chlorin.

8. Method of treating soya bean oil, comprising combining the same with approximately 5-15% by weight of chlorin, and thereafter eliminating a part only of the combined chlorin.

9. Method of treating soya bean oil, comprising combining the same with approximately 5-15% by weight of chlorin, and thereafter eliminating 40-60% of the combined chlorin.

In testimony whereof, I affix my signature.

HENRY A. GARDNER.